Aug. 4, 1953   J. E. HORSTE   2,647,354
RESILIENT UNIVERSAL MOUNTING FOR TRACTOR MOWERS
Filed Aug. 16, 1949   3 Sheets-Sheet 1
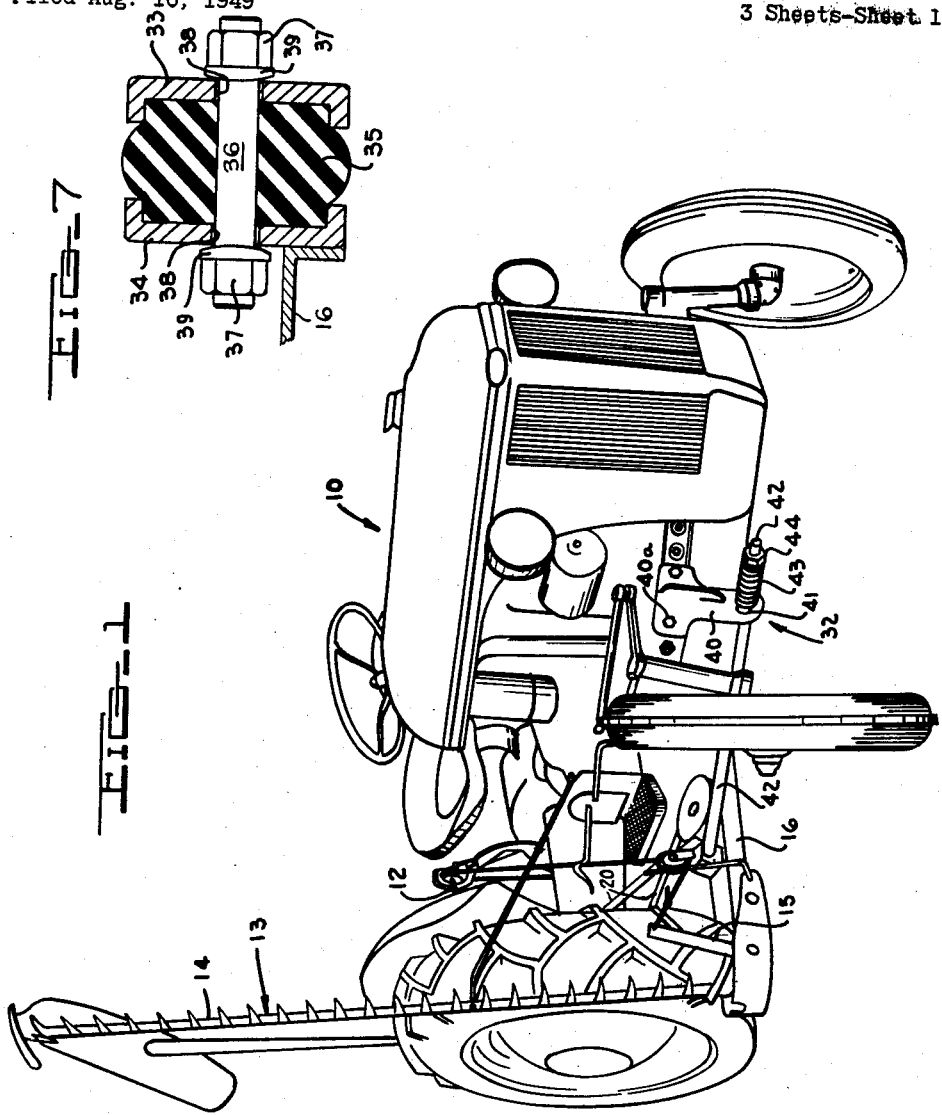
INVENTOR.
JOSEPH E. HORSTE
BY
ATTORNEY Aug. 4, 1953    J. E. HORSTE    2,647,354
RESILIENT UNIVERSAL MOUNTING FOR TRACTOR MOWERS
Filed Aug. 16, 1949    3 Sheets-Sheet 2
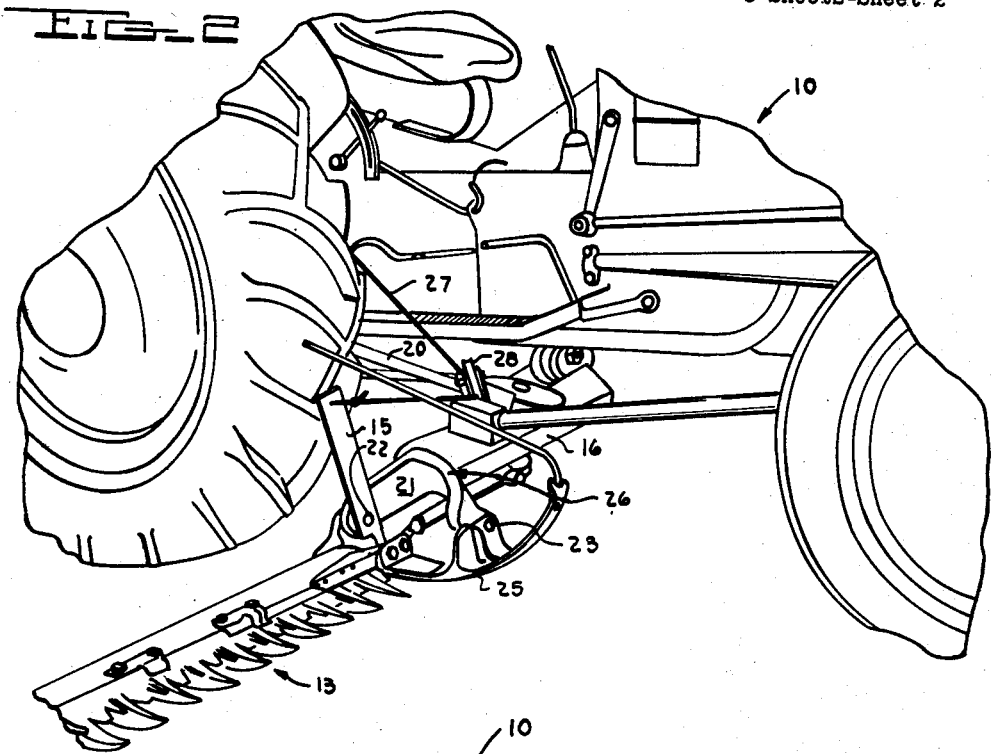
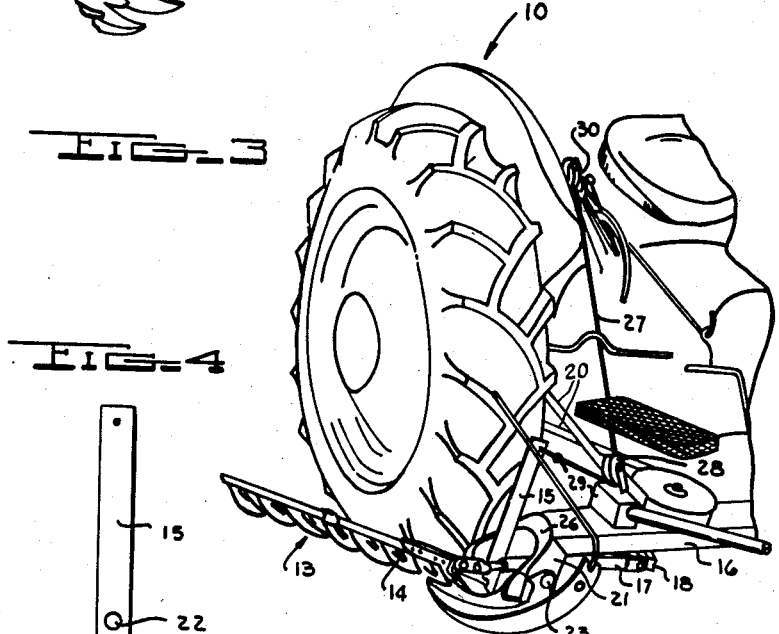
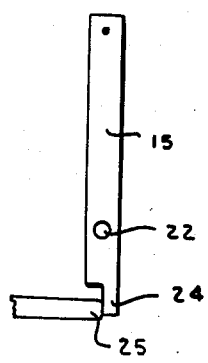
INVENTOR.
JOSEPH E. HORSTE
BY
ATTORNEY

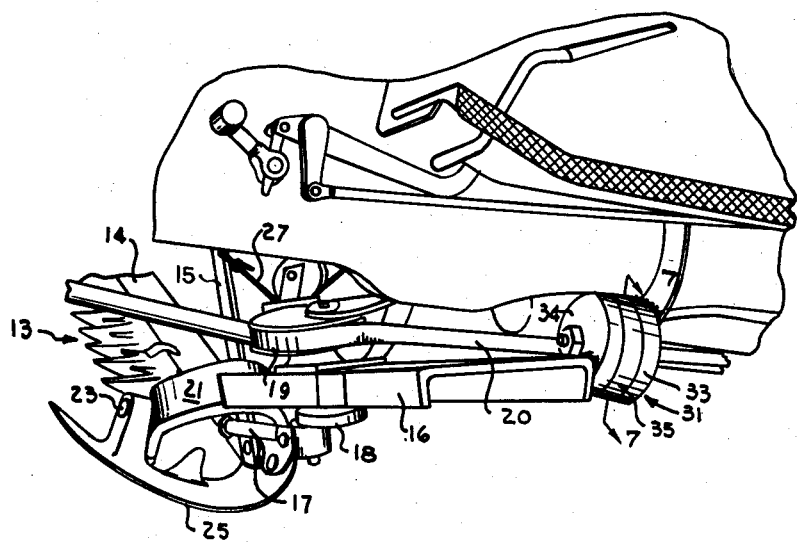
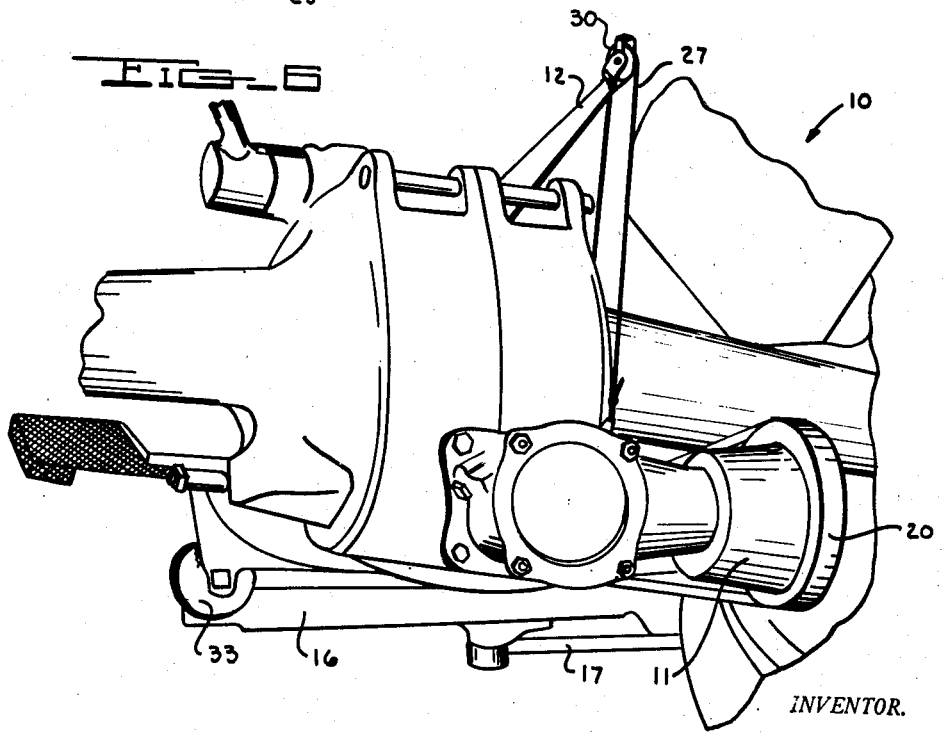

Patented Aug. 4, 1953

2,647,354

UNITED STATES PATENT OFFICE 2,647,354

RESILIENT UNIVERSAL MOUNTING FOR TRACTOR MOWERS

Joseph E. Horste, Belleville, Mich.

Application August 16, 1949, Serial No. 110,605

6 Claims. (Cl. 56—25)

This invention relates to a mowing attachment for tractors and relates more particularly to a relatively lightweight mower which is detachably secured to the tractor and extends outwardly from a side thereof.

It is an important object of the present invention to provide a relatively lightweight mower attachment of the above type suitable for use with conventional tractors which is relatively economical to manufacture and which may be easily and quickly attached to the tractor and in which the cutter mechanism may be actuated by a direct belt drive from the power take-off of the tractor and in which the cutter mechanism may be raised to an inoperative position in some cases by the power lift arm of the tractor and in other cases by any suitable mechanically or manually operated means. The savings in weight and cost in a typical instance average as much as 30% over competing types of such attachments.

Another object of the invention is to provide a mower attachment in which the vibration therein, either due to oscillations of the sickle of the cutter mechanism or to other vibrations, such as due to engagement of the cutter mechanism with rough terrain, are dampened to prevent transmission thereof to the tractor proper.

Another object of the present invention is to provide a mowing attachment in which the weight of the cutter mechanism is substantially self-supported in the lowered or operative position and in which the entire mowing attachment may be raised to provide increased ground clearance below the attachment and to substantially fully support the attachment in its inoperative position.

Another object is to provide a mowing attachment having a convenient provision for adjusting the tension on the cutter mechanism drive belt and which provides a safeguard against damage to the cutter mechanism by relieving the tension on the drive belt upon contact of the cutter mechanism with an obstruction.

A feature of the present invention is to provide an adjustable resilient universal mounting for a mowing attachment of the above type which yieldably holds the mowing attachment in a forward position to maintain tension on the drive belt for the cutter mechanism and to permit rearward pivotal movement of the mowing attachment when the cutter mechanism engages an obstacle to relieve the tension on the drive belt and which permits limited vertical movement of the mowing attachment to allow the cutter mechanism to substantially support its own weight in the lowered or operative position and to permit raising of the entire mowing attachment relative to the tractor to provide increased ground clearance and to remove substantially all of the weight of the mowing attachment from the resilient universal mounting.

Other objects of this invention will appear in the following description and appended claims, reference being had to the accompanying drawings forming a part of this specification wherein like reference characters designate corresponding parts in the several views.

Fig. 1 is a perspective view showing a mowing attachment embodying the features of the present invention, mounted on a conventional tractor and illustrating the cutter mechanism in the upright position.

Fig. 2 is an enlarged fragmentary perspective view of the mower attachment of the present invention, illustrating the cutting mechanism in the operative or horizontal position.

Fig. 3 is a similar view showing the cutter mechanism raised to the inoperative position.

Fig. 4 is an enlarged fragmentary view illustrating the pivotal connection of the lifting lever and the engagement thereof with the cutting mechanism.

Fig. 5 is a similar view showing the mower mechanism viewed from the rear of the tractor, and particularly showing the resilient support and the transmission mechanism for driving the sickle.

Fig. 6 is a similar view showing the power take-off of the tractor and belt drive for the sickle and also showing the attachment of the lifting cable.

Fig. 7 is an enlarged section taken substantially on the lines 7—7 of Fig. 5.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A mowing attachment embodying the features of the present invention is shown in the drawings in assembled relation with a conventional tractor 10 provided with a power take-off 11 and a lifting arm 12. The mowing attachment is preferably secured to the frame of the tractor and is provided with a cutter mechanism 13 having a sickle 14 operated by the power take-off 11 of the tractor and a lifting lever 15 operated by the lifting arm 12 of the tractor and adapted to pivot the cutter mechanism relative to the support 16 of the mowing attachment.

The sickle 14 is driven by a transmission mechanism including the pitman arm 17 which is connected to the crank 18, shown particularly in Fig. 5, which in turn is rotatable with the pulley and flywheel 19. The transmission mechanism is mounted on the support 16. The flywheel is driven by the belt 20 which is reaved on the pulley 19 and the power take-off 11 respectively (Fig. 6).

The cutter mechanism 13 is pivoted on a rigid fork 21 of the support 16 about the pins 22 and 23 and is swingable from the lowered horizontal operative position (Fig. 2) to the upright vertical position (Fig. 1). The mower attachment including the cutter mechanism and the support 16 may also be raised to provide additional ground clearance in the inoperative position of the cutter mechanism, as shown in Fig. 1.

The initial pivotal movement of the cutter mechanism 13 (Fig. 3) is effected by operation of the lifting arm 12 of the tractor. The raising of the entire mower assembly to increase ground clearance is also accomplished by the lifting arm 12.

With reference to Fig. 2, it may be seen that the lifting lever 15 is pivoted on a common axis with the cutter mechanism 13 about the pin 22. The lower end of the lever is provided with an abutment 24 (see Fig. 4) which is adapted to engage an edge portion of the shoe 25 of the cutter mechanism. In the lowered position of the cutter mechanism, the lever is tilted outwardly (Fig. 2) and spaced from the stop 26 on the inner edge of the fork 21. A cable 27 has one end secured to the upper end of the lifting lever 15 and passes through the pulley 28 mounted on a block 29 on the support 16 and also passes through the pulley 30 carried by the lifting arm 12 of the tractor. The opposite end of the cable 27 is secured to a portion of the tractor by any suitable means, as shown particularly in Fig. 6.

Vertical movement of the lifting arm 12 effects a shortening of the cable between the lifting arm 12 and the lifting lever 15, which pivots the lever and also the cutter mechanism about the pins 22 and 23. The pivotal movement of the cutter mechanism 13 by the lever 15 is limited due to engagement of the lever with the stop 26 (see Fig. 3). Continued movement of the lifting arm 12 and the cable 27, raises the entire mower attachment relative to the tractor. This latter action is permitted by virtue of a pivotal mounting between the mower attachment and the tractor.

The mounting for the mower attachment comprises a resilient coupling 31 which permits limited universal movement of the mower attachment relative to the tractor and a longitudinally sliding connection 32 which resiliently and yieldably holds the cutter mechanism against rearward movement or displacement and also maintains the correct tension on the belt 20 during normal operation of the mower.

The resilient coupling 31 is shown particularly in Figure 7 and comprises cups 33 and 34. The cup 34 is connected to the support 16, preferably by welding, and the cup 33 is formed as a part of a bracket secured to the tractor. A ring of resilient material 35, such for example as rubber, is positioned between the cups 33 and 34 and is preferably maintained under compression by a bolt 36 and nuts 37. The openings 38 in the cups are somewhat enlarged and the washers 39 have a convex face to permit limited universal movement between the cups 33 and 34.

The longitudinal slidable connection, shown particularly in Figure 1, comprises a bracket 40 secured to a forward portion of the tractor, such as by the bolts 40a, which has a somewhat enlarged opening 41 to slidably receive the longitudinally extending rod 42 and to permit limited angular movement relative thereto. The rod 42 is rigidly secured to the block 29 of the support 16 and is urged in a forward direction by the spring 43. A nut 44 is threaded on the forward end of the rod 42, engaging the forward end of the spring 43 and may be adjusted on the rod to adjust the tension on the belt 20.

In the present disclosure, the mowing attachment of the present invention is shown as applied to a tractor having power actuated arms for raising the cutter bar and mower mechanism. It is to be understood, however, that the attachment of the present invention may be applied to tractors of other types on which suitable mechanically or manually operated means may be employed for raising and lowering the cutter bar and mower mechanism.

The mounting for the mower attachment on the tractor is an important feature of the present invention since it performs several functions in addition to supporting the mower attachment. The mounting allows a limited horizontal movement relative to the tractor in order that tension on the belt for driving the sickle may be easily and conveniently adjusted. The mounting is resilient and yieldably holds the mower assembly in adjusted position in order that rearward horizontal movement thereof, such as upon engagement of the cutter mechanism with an obstruction, will automatically cease the oscillation of the sickle by reducing tension on the belt driving the sickle. The mounting also allows limited vertical movement, relative to the tractor, in order that the mower attachment may be raised while inoperative to increase road clearance. In addition, the mounting provides a very simple and convenient means for attachment of the mower to the tractor and permits the lifting arm mechanism to carry substantially all of the weight of the mower assembly when the latter is in its raised position. It should be noted that in the lowered position of the cutter mechanism, the shoes carry substantially all of the weight of the mower attachment.

Another important feature of the present invention is the construction and arrangement of the flywheel 19 and its associated parts. As is apparent from the drawings, the flywheel 19 rotates substantially in a horizontal plane about a substantially vertical axis. Also, the plane containing the flywheel 19 is substantially parallel to a plane containing the pitman arm 17. This particular arrangement is found to provide improved operation of the tractor by reducing the vibrations therein, because the flywheel is then in a position where it can most readily absorb vibrations from the cutter mechanism 13 which otherwise be transmitted to the tractor. Further, this arrangement provides a more simple and improved belt adaptation which does not require idlers and gives longer life to the belt.

Having thus described my invention, I claim:

1. In combination with a tractor having a power take-off, a supporting arm extending laterally from said tractor and having a resilient universal mounting operatively connecting the same to said tractor, a sickle pivotally connected to said supporting arm by means of a horizontal pivot, a rod connected to said supporting arm at a point spaced outwardly from said tractor and having a resilient connection to a forward portion of said tractor, a sickle driving pulley mounted on said supporting arm, and belt driving means operatively connected to said pulley and said power take-off, rearwardly of said supporting arm, whereby when the sickle encounters an obstruction and swings rearwardly against the tension of said resilient means, the belt driving means will become ineffective.

2. In combination with a tractor having a power take-off, a supporting arm extending laterally from said tractor and having a resilient universal mounting operatively connecting the same to said tractor, a sickle pivotally connected to said supporting arm by means of a horizontal pivot, a rod connected to said supporting arm at a point spaced outwardly from said tractor and having a resilient connection to a forward portion of said tractor, a substantially horizontally disposed driving pulley journalled in said supporting arm, and belt driving means operatively connected to said pulley and said power take-off, rearwardly of said supporting arm, whereby when the sickle encounters an obstruction and swings rearwardly against the tension of said resilient means, the belt driving means will be come ineffective.

3. In combination wth a tractor having a power take-off, a supporting arm extending laterally from said tractor and having a resilient universal mounting operatively connecting the same to said tractor, said resilient universal mounting including a pair of cups, one being rigidly secured to the tractor and the other being rigidly secured to the supporting arm, a resilient member carried in said cups and separating the latter, and compression means engaging said cups to maintain said resilient member under compression, a sickle pivotally connected to said supporting arm by means of a horizontal pivot, a rod connected to said supporting arm at a point spaced outwardly from said tractor, and having a resilient connection to a forward portion of said tractor, a sickle driving pulley mounted on said supporting arm, and belt driving means operatively connected to said pulley and said power take-off, rearwardly of said supporting arm, whereby when the sickle encounters an obstruction and swings rearwardly against the tension of said resilient means, the belt driving means will become ineffective.

4. In combination with a tractor having a power take-off, a supporting arm extending laterally from said tractor and having a resilient universal mounting operatively connecting the same to said tractor, a sickle pivotally connected to said supporting arm by means of a horizontal pivot, a rod connected to said supporting arm at a point spaced outwardly from said tractor and having a resilient connection to a forward portion of said tractor, a transmission means mounted on said supporting arm for driving said sickle, and belt driving means operatively connected to said transmission means and said power take-off, rearwardly of said supporting arm, whereby when the sickle encounters an obstruction and swings rearwardly against the tension of said resilient means, the belt driving means will become ineffective.

5. In combination with a tractor having a power take-off, a supporting arm extending laterally from said tractor and having a resilient universal mounting operatively connecting the same to said tractor, a sickle pivotally connected to said supporting arm by means of a horizontal pivot, a rod connected to said supporting arm at a point spaced outwardly from said tractor, a bracket attached to a forward portion of said tractor to which said rod is connected by a slip joint, an adjustable resilient means associated with said rod and bracket for resiliently limiting movement of the rod in the slip joint, a sickle driving pulley mounted on said supporting arm, and belt driving means operatively connected to said pulley and said power take-off, rearwardly of said supporting arm, whereby when the sickle encounters an obstruction and swings rearwardly against the tension of said resilient means, the belt driving means will become ineffective.

6. In combination with a tractor having a power take-off, a supporting arm extending laterally from said tractor and having a resilient universal mounting operatively connecting the same to said tractor, a sickle pivotally connected to said supporting arm by means of a horizontal pivot, a rod connected to said supporting arm at a point spaced outwardly from said tractor and having a resilient connection to a forward portion of said tractor, a sickle driving pulley mounted on said supporting arm, belt driving means operatively connected to said pulley and said power take-off, rearwardly of said supporting arm whereby when the sickle encounters an obstruction and swings rearwardly against the tension of said resilient means, the belt driving means will become ineffective, and means for raising said sickle around said horizontal pivot.

JOSEPH E. HORSTE.

References Cited in the file of this patent

UNITED STATES PATENTS

| Number | Name | Date |
| --- | --- | --- |
| 1,326,256 | Ellis | Dec. 30, 1919 |
| 1,947,552 | Huddle | Feb. 20, 1934 |
| 2,245,451 | Simpson | June 10, 1941 |
| 2,281,059 | Anderson | Apr. 28, 1942 |
| 2,292,943 | Horste | Aug. 11, 1942 |
| 2,311,095 | Simpson et al. | Feb. 16, 1943 |
| 2,328,838 | Oberlink | Sept. 7, 1943 |
| 2,502,805 | Spurlin | Apr. 4, 1950 |
| 2,532,426 | Schroeppel | Dec. 5, 1950 |